Oct. 18, 1927.

G. J. MAY

CHECK BOOK

Filed Aug. 27, 1923

Inventor
Gerald J. May

By Stuart C. Barnes
Attorney

Oct. 18, 1927.

G. J. MAY 1,646,033

CHECK BOOK

Filed Aug. 27, 1923

CHECK BOOK BUDGET SYSTEM FOR THE MONTH OF March.

| INCOME DEPOSITED IN CHECKING ACC. | | EXPENDITURES | ESTIMATED | ACTUAL | DIFF. |
|---|---|---|---|---|---|
| SALARY | | HOUSERENT, GARAGE, HOTELS | | | |
| INTEREST ON SAVINGS | | FOOD | | | |
| DIVIDENDS | | CLOTHING | | | |
| RENTS RECEIVED | | LIGHT, GAS & TELEPHONE | | | |
| OTHER INCOME | | AMUSEMENTS, TRAVEL | | | |
| | | INSURANCE, TAXES | | | |
| | | ALLOWANCE FOR GENERAL EXPENSES | | | |
| | | SERVANTS, HELP, ETC. | | | |
| | | CHURCH, CLUBS, CHARITY | | | |
| | | DEPOSITED IN SAVINGS ACCOUNT | | | |
| TOTAL INCOME | | TOTAL EXPENDITURES. | | | |

RESERVE FOR FUTURE EXP.

TOTAL INCOME $ _____

PLUS BAL. IN RESERVE $ _____ $ _____

LESS TOTAL EXPENDITURES $ _____ $ _____

LESS RESERVE FOR FUTURE EXP. $ _____

BAL. TO BE DEPOSITED IN SAVINGS ACC. $ _____

Fig. 2

Inventor
Gerald J. May
By Stuart C. Barnes
Attorney

Patented Oct. 18, 1927.

1,646,033

UNITED STATES PATENT OFFICE.

GERALD J. MAY, OF DETROIT, MICHIGAN.

CHECK BOOK.

Application filed August 27, 1923. Serial No. 659,448.

This invention relates to check books and has for its object a combined check book and monthly comparative budget and expense account.

It is the object of the present invention to combine a budget and expense account with a check book in such a way that each expenditure by check may be conveniently assigned to its proper column in the expense account so that at the end of the month the expense account in each column may be totaled so as to give a quick and easy summary of each line of expense for the month. This permits these totals to be carried into a comparative relation with the estimated expense in each class for the month so as to make it possible to learn how nearly the estimate was approached. Preferably, the comparative actual expense totals and budget totals are provided with a column indicating the actual difference between the estimated expense and actual expense.

It is the purpose of the invention to promote economy of living and saving by the use of the check book so as to increase the average annual deposits of each depositor of the bank using this check book and budget system.

In the drawings:

Fig. 1 is a plan view showing a check book with the monthly budget and expense account in place behind the check stub.

Fig. 2 is a view of the monthly expense and budget account.

The check books are made so far as the checks are themselves concerned, in precisely the same way as is now common in check books where each page has three checks. However, with the stubs these are cut away in four places, as at $a$, $b$, $c$ and $d$. The upper cutting out of the stub is for exposing the headings of the vertical expense columns. The other three cut out openings $b$, $c$ and $d$ are for the purpose of exposing the blank columns for the purpose of entry of the amount of the check in the proper column.

The expense and budget account is shown in detail in Fig. 2. This is a card which is here ruled with ten double vertical columns, but obviously any number of columns could be had, which would conveniently come within the width of the stubs. At the heads of the columns are the headings which may be any suitable classification of expense. I have found that the headings indicated in Fig. 2 are convenient although obviously other classifications might be made to suit the designer.

Directly at the right of these columns, is an account 2, for carrying the totals derived from adding these columns. Additionally, this account carries places for totaling the income derived from various general sources, such as salaries, interest on savings, dividends, rents, and other income. On the right of this will be seen the same horizontal headings as appear at the heads of the columns such as 1. House rent, garage, hotels; 2. Food; 3. Clothing; 4. Light, gas and telephone; 5. Amusements and travel; 6. Insurance and taxes; 7. Allowance for general expenses; 8. Servants, help, etc.; 9. Church, clubs, charity; 10. Deposited in savings account. Opposite each one of these classes is a vertical column headed "Estimated"; at the right of this column is another column "Actual." Into this column is carried the totals derived from the additions of the ten columns that are exposed through the openings in the check stubs. The third column from the right is headed "Difference." In this may be noted the difference between the actual expense and the estimated expense. The estimated totals comprise the actual budget. By affecting this classification of expenses and observing the differences noted in this column the keeper of the check book may be informed so as to properly formulate his budget items for the next month. He may increase or decrease his budget as a study of the check book stubs may make him feel it necessary to do, or it is hoped that he may form new resolutions to make his expenditures for the following month come more nearly within what he conceives is a proper estimate of what it should be.

At the bottom of the card that appears in Fig. 2, is an account 3 or general record of totals. For instance, at the right in the line "Total income" is placed the total income found by adding the income items for various classes shown in the above No. 2 income account. To this is added the balance or reserve from the previous month. This gives the total of the debits of the cash account kept by the stubs. When from this is subtracted the total of the expense items as shown by adding the totals in the above expense, this will give the balance on hand. The check book owner then estimates in a general way how much he ought to carry in his commercial account for future transactions and puts this amount opposite the line entitled "Less reserve for future expenses." He subtracts this from his balance and this gives the item to be placed in the blank space opposite the title "Balance to be deposited in savings account."

Of course, it is not the purpose of the applicant to limit the patent to any of the classifications or any of the specific account headings as indicated in the drawings. The invention in its broader aspect comprises the providing of suitable openings or windows in the check book stubs to permit the use of columns for tabulations. This tabulation of expenses in a plurality of columns is in itself a useful thing without a further plan of accounting. However, there is combined with this on the same sheet, a debit and credit account. The debit account might for some purposes be omitted; the credit account, however, is directly related with the tabulations by reason of having the same headings carried horizontally in the account as are carried vertically in the tabulations. This forms a comparative account or a comparative budget and actual expense account by reason of the two vertical headings: "Estimated" and "Actual" expenses. The third vertical heading may or may not be used, and constitutes an expression of the difference existing between the two items under the vertical headings.

The third account on the monthly statement is directly related to the second account by means of carrying into the third account the two totals of income and expenditures which are achieved by adding up the columns in the second account. To this we have added one or two items for the purpose of achieving useful information in totals and determining how much the owner of the check book may safely assign to a savings account. This third account constitutes a summary account of the totals achieved in the second column, to which may be added such other calculations as may seem desirable.

If one of the columns, for instance, the food column under the first check becomes filled up, say by the entrance of four items already on this, more room may be afforded by simply grasping the card at the top and shifting it up temporarily so that the $7.00 shown on the dotted lines can be entered in the appropriate column as shown.

What I claim is:

1. In a check book comprising a plurality of sheets, a plurality of blank stubs arranged with a plurality of checks and stubs on a single sheet, the stub portion of respective sheets being provided with a plurality of openings forming windows, and an account sheet comprising a plurality of vertical columns provided with suitable headings, the said vertical columns being arranged and dimensioned so that the headings are exposed in the upper opening and the columns are exposed in the other openings in the stubs for the purpose of entering in the proper column through said openings, the amount appearing on such check stub.

2. A check book comprising a series of sheets, each sheet consisting of a plurality of blank checks and stubs, a plurality of openings in the stub portion of each sheet registering with similar openings in the adjacent sheets, and a blank account sheet with suitable headings and columns, said headings and columns being exposed through said openings for receiving notations corresponding to the notations on the stubs.

3. A check book comprising a series of sheets, each sheet consisting of a plurality of blank checks and stubs, a plurality of openings in the stub portion of each sheet registering with similar openings in the adjacent sheets, and a blank account sheet with suitable headings and columns, said headings and columns being exposed through said openings for receiving notations corresponding to the notations on the stubs, said openings being of a relatively large size to expose portions of the surface of said blank sheet for receiving a plurality of notations of the nature corresponding to those entered on the stubs on the successive sheets, said blank sheet being adjustable to expose an additional blank space for receiving notations.

In testimony whereof I affix my signature.

GERALD J. MAY.